Figure 1:
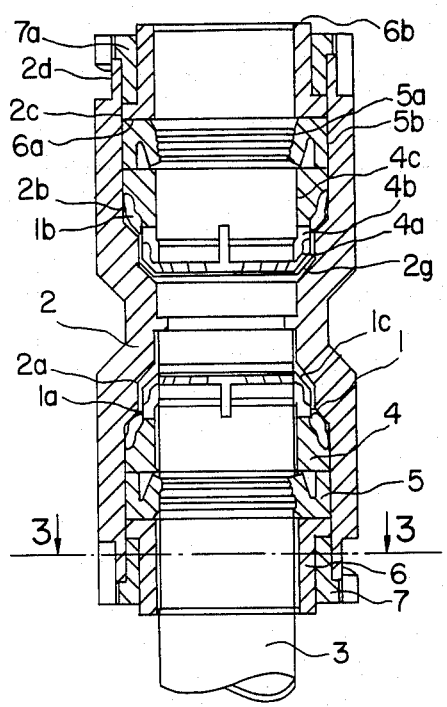

United States Patent [19]

Legris

[11] Patent Number: 4,810,009

[45] Date of Patent: Mar. 7, 1989

[54] INSTANTANEOUS CONNECTION DEVICE FOR PLASTIC AND METAL MATERIAL TUBES

[75] Inventor: André Legris, Rennes, France

[73] Assignee: Legris S.A., Rennes, France

[21] Appl. No.: 83,528

[22] Filed: Aug. 7, 1987

Related U.S. Application Data

[63] Continuation of Ser. No. 855,137, Apr. 23, 1986, abandoned.

[30] Foreign Application Priority Data

Apr. 29, 1985 [FR] France ................ 8506627

[51] Int. Cl.⁴ ............................................. F16L 17/02
[52] U.S. Cl. .................................... 285/39; 285/111; 285/340; 285/348
[58] Field of Search ............... 285/39, 111, 340, 348

[56] References Cited

U.S. PATENT DOCUMENTS

| | | | |
|---|---|---|---|
| 3,909,046 | 9/1975 | Legris | 285/39 |
| 4,021,062 | 5/1977 | Mariaulle | 285/39 |
| 4,240,651 | 12/1980 | Mariaulle | 285/39 |
| 4,305,606 | 12/1981 | Legris | 285/39 |
| 4,508,369 | 4/1985 | Mode | 285/39 |

FOREIGN PATENT DOCUMENTS

| | | | |
|---|---|---|---|
| 2012796 | 3/1970 | France. | |
| 2258585 | 8/1975 | France. | |
| 2274483 | 1/1976 | France. | |
| 2319833 | 2/1977 | France. | |
| 2479406 | 10/1981 | France. | |
| 6700801 | 7/1967 | Netherlands | 285/340 |
| 2060106 | 4/1981 | United Kingdom | 285/340 |

*Primary Examiner*—Thomas F. Callaghan
*Attorney, Agent, or Firm*—Roland Plottel

[57] ABSTRACT

A connection device is provided for plastic material or metal tubes conveying a compressed fluid in which the tube 3 is fitted instantaneously by a simple thrust in means providing molding for said tube by a member 1 and sealing thereof by a member 5, the means 2d formed on the outer casing 2 receiving an independent disassembly element for instantaneous disassembly of tube 3.

9 Claims, 3 Drawing Sheets

INSTANTANEOUS CONNECTION DEVICE FOR PLASTIC AND METAL MATERIAL TUBES

This application is a continuation of application Ser. No. 855,137, filed 4/23/86, now abandoned.

The present invention relates to a connection device for plastic and metal material tubes comprising connection means providing instantaneously engagement engagement and sealing of the pipes or accessories by simply pushing them in the connection. Disconnection of said pipes is also instantaneous by pushing a member provided for this use.

This type of instantaneous connection is well known, since it is described in several French Pat. Nos. (2.012. 796, 2,319,833, 2,258,585, 2,479,406 and, more especially, U.S. Pat. No. 2,274,483 which relates to a connection device capable of resisting high tractive forces on the tube, without risk of extrusion of this latter), which patents belong to the applicant and come within the field of pneumatic automation connection. Means for receiving mounting tools are described, but they act on a very reduced arc of a circle portion, which may cause problems in so far as the dismantling forces are concerned.

The present invention relates more particularly to pipes made from plastic material, for example from cross-linked polyethylene, used for the distribution of sanitary cold and hot water as well as for that of central heating in the building field. The instantaneous connections for said application are not very numerous. There exist connections in which the piece holding the pipe is a split resilient ring obtained sometimes by cutting, rolling or stamping engaging the tube while being gripped inside a circular inner envelope of the connection body or sliding freely in this envelope. However, although this type of connection for the application more particularly considered above allows the tube to be fitted instantaneously, removal thereof is not instantaneous.

Most of the connection systems at present on the market are traditional systems with non instantaneous assembly and disassembly. These are mostly connections comprising four parts: the body forming the envelope or case of the connection, a compression ring for holding and sealing the tube, a clamping screw and a seleve intended to support the tube in its inner diameter, the whole being made from brass.

These traditional connections no longer respond to the conditions required for their use in installations for the distribution of water through plastic material tubes for, economically, the time required for using them is too long and costly which is not tolerable at the present time in particular when it is a question of industrialized firms.

The present invention provides a connection device for plastic material and material pipes conveying a fluid and more specifically cold and hot water and in which said tube is fitted instantaneously by simply pushing it in means which lock it, these means being able to release said tube instantaneously by simply pushing an adequate member.

The connection device is formed from a casing forming a container having at least one female instant connection means and at most a threaded means for fixing said means which may be combined with members for mounting on an apparatus or a pipe.

The device of the invention has a casing inside which several concentric cylindrical surfaces each receive members cooperating so as to obtain correct connection of the pipe. The circular resilient means for engaging the pipe, contained in one of the inner cylindrical housings of the casing, is disposed in a space allowing the free play required for releasing the elements provided for engaging the pipe during disassembly of the pipe, and antagonistic member avoids turning of the elements of said engagements when connection of the pipe is achieved; this arrangement guarantees the efficiency of the connection. In a second inner cylindrical housing of the casing, housing the circular resilient means for engaging the pipe by its outer circular part, an annular device prevents said engagement means from moving back and imprisons them inside the casing.

In accordance with the present invention, the instantaneous female connection means comprises on its outer casing and at the end or in one of its inner bores receiving an adequate member, shapes provided for instantaneously adapting pipe disassembly means.

Said means are independent of the connection as a safety measure so as to avoid untimely dismantling which would be dangerous for any certainty of a good connection, this is a feature of the invention.

These disassembly means may be formed either on the outer casing of the connection body, or on components disposed in said body.

The invention, more particularly intended for water supply devices in the building field, is not limited to this use and may also be suitable for all fluid circuits at medium pressure which is limited by the strength of the plastic material tubes.

Figure 2:
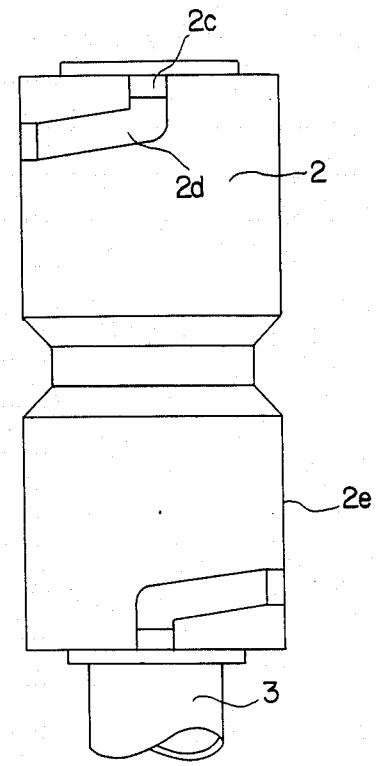
Figure 3:
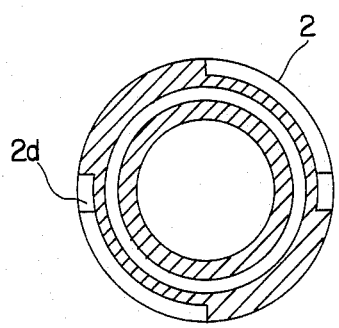
Figure 4:
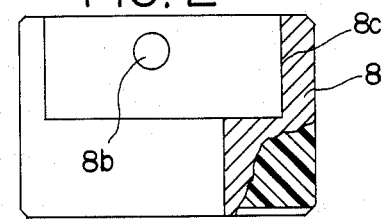
Figure 5:
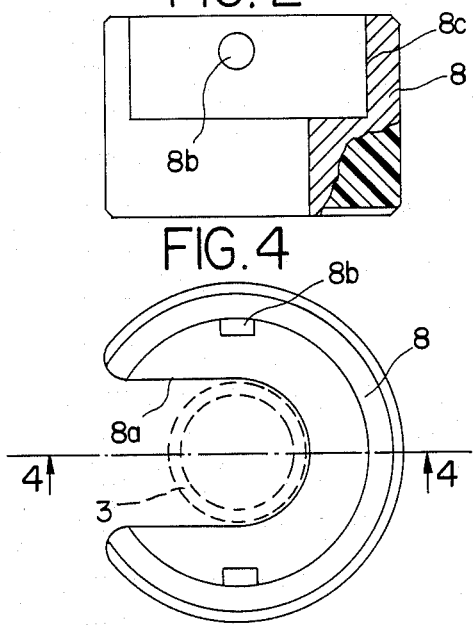
Figure 6:
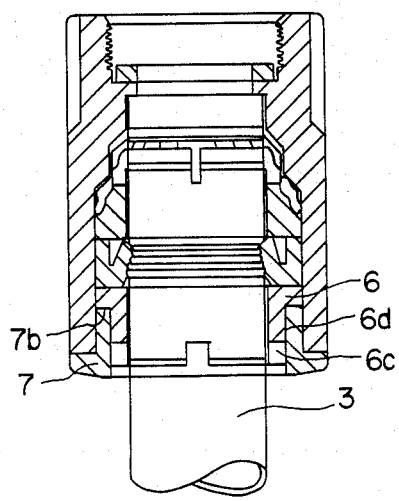
Figure 9:
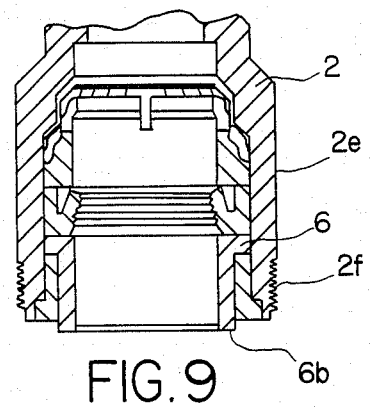
Figure 7:
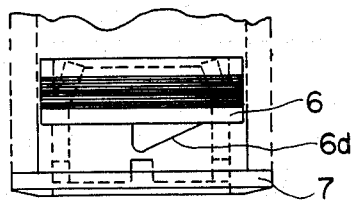
Figure 10:
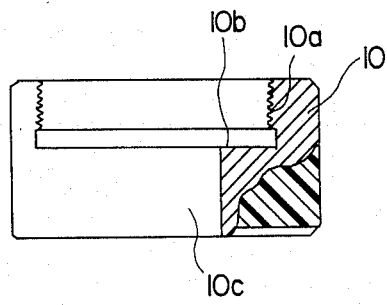
Figure 8:
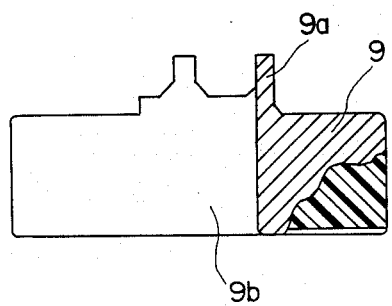

Other features and advantages of the invention will be better understood from reading the following description of several embodiments with reference to the accompanying drawings in which:

FIG. 1 is an elevational view in axial section of one embodiment of the invention, FIG. 2 is an elevational view of FIG. 1, FIG. 3 is a radial sectional view of FIG. 1, FIG. 4 is an axial sectional view of a disconnection system of FIG. 1, FIG. 5 is an end view of FIG. 4, FIG. 6 is an elevational view in axial section of another embodiment of the invention with unlocking by means of an inner cam, FIG. 7 is an outer view without casing of the embodiment of FIG. 6, FIG. 8 is an axial sectional view of a disconnection system of FIG. 6, FIG. 9, is an elevational view in section of another embodiment of the invention with unlocking by external thread, and FIG. 10 is an axial sectional view of a disconnection system of FIG. 9.

Figure 11:
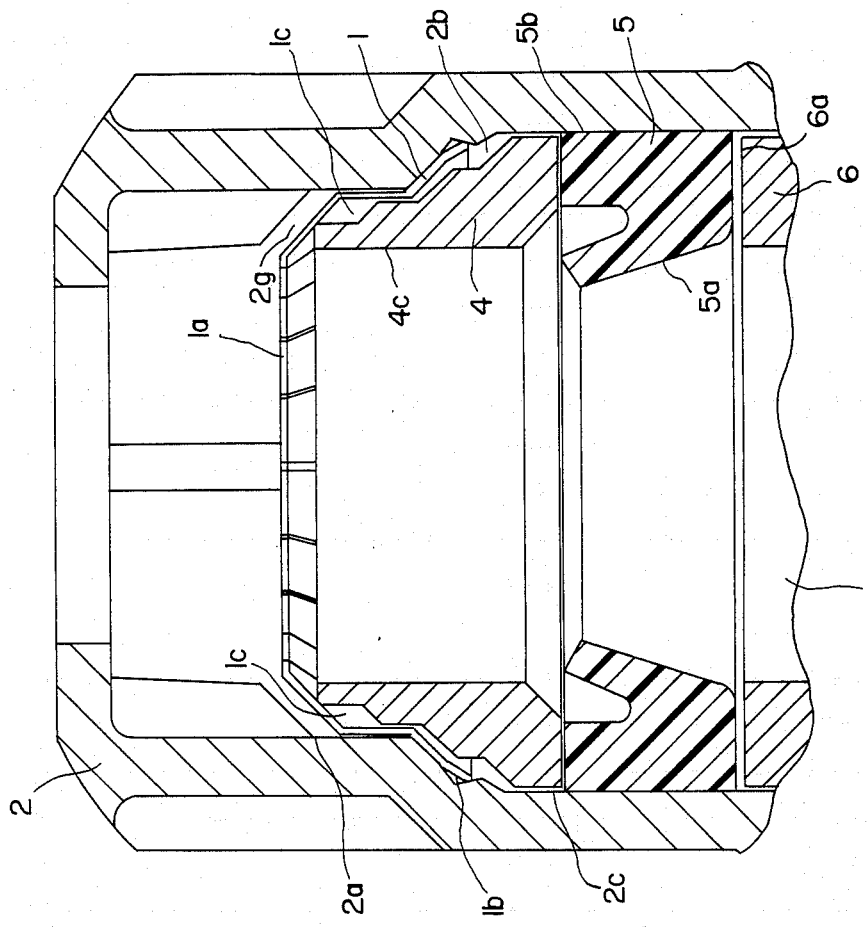

FIG. 11 is an enlarged elevational view in axial section of one embodiment of the invention as shown in FIG. 1.

In FIG. 1 has been shown a connection device comprising pipe holding, sealing and disassembly means, in which an element 1, centered by its circular periphery 1a in a housing 2a itself circular in body 2, immobilized in translation by its largest diameter end 1b against an annular boss 2b formed in the circular housing 2c of said body 2, holds the pipe 3 in the connection by means of several engagement lugs 1c.

A supporting ring 4 disposed in the circular housing 2c behind the engagement element 1 by its front part 4c prevents the engagement lugs 1c from turning over when pressure is applied to the device, while promoting spacing apart of said engagement lugs 1c in space 2g during disconnection of pipe 3, this supporting ring 4 made from a plastic material which is made flexible at one of its ends by several slits 4b which confer thereon by its inner orifice 4c a possibility of clamping on pipe 3 causing, during fitting of said pipe, said engagement lugs 1c to move apart.

Sealing of tube 3 is provided by the zone 5a of a lip seal 5 situated in the cylindrical housing 2c of body 2, the outer sealing of the connection being provided by zone 5b of said seal whose annular face in contact against that of member 6 at 6a increases the pressure of the sealing zone 5a when the device is in normal operation under pressure.

The thrust member 6 sliding respectively in the housings 2c and 7a of the body 2 and of plug 7 fixed to casing 2 by ultrasounds or friction, is the means transmitting the force for disassembling pipe 3.

On the outer circular casing of body 2 there is formed at least one helical ramp of rectangular section 2d allowing a disassembly element to be positioned inside and which, by a rotational movement, moves in translation and exerts an axial force, this element is an important characteristic of the invention, on the face 6b of the thrust element 6. Said force is transferred successively to the lip joint 5 and to the supporting member 4 which raises the engagement lugs 1c of element 1 and causes disconnection of pipe 3.

FIG. 2 shows several helical ramps 2d inside which the disassembly element moves in said ramps which are open on the face 2c of casing 2 for introducing said disassembly element.

FIG. 3 shows the angular positioning of ramps 2d formed on the periphery of casing 2. The slope of the helix could provide reversibility of the rotation of the disassembly element.

In FIGS. 4 and 5 is shown the disassembly element 8 in which is formed an indentation 8a allowing this element to be placed about pipe 3, the two studs 8b are intended to slide in the ramps 2d of FIGS. 1, 2 and 3, during the rotation required for disassembling the pipe from said disassembly element which is guided in its cylindrical inner housing 8c by the outer cylindrical pipe of connection 2.

FIG. 6 shows another connection device which, for controlling the independent disassembly element, is formed with recessed rectangular catches 6c disposed circularly on the pusher 6. Said pusher, under the effect of a certain angular rotation caused by the disassembly element, also moves in translation by means of at least one cam element 6d, whose counter shapes are disposed at 7b in plug 7. This element is an important feature of the invention causing an axial thrust on the lip seal 5 and the supporting ring 4 which raises the engagement lugs 1c of element 2 causing disconnection of pipe 3.

FIG. 7 shows the arrangement of one of cams 6d about the thrust element, the slope thereof could permit reversibility of the rotation of the disassembly element.

FIG. 8 shows the independent disassembly element 9 on which several studs 9a are disposed circularly for rotationally driving the thrust element 6 through its notches 6c for disconnecting pipe 3. The indentation 9b allows it to be placed about said pipe 3.

FIG. 9 shows another connection device comprising, for controlling the independent disassembly element, an external threaded portion 2f disposed on the external circular casing 2e of body 2. Said disassembly element acts by rotation like a nut bearing on face 6b which, by its rotational movement, moves in translation and exerts an axial force on said face 6b, said force being transferred successively to the lip seal 5 and to the supporting member 4 which raises the engagement lugs 1c of element 1 causing disconnection of pipe 3.

FIG. 10 shows an independent disassembly element 10 having a tapped orifice 10a which screws on the outer threaded portion 2f of casing 2 whose face 10b bears on the end 6b of pusher 6 for disconnecting the pipe 3, the indentation 10c allowing it to be fitted about the pipe.

The present invention finds an application more particularly in assemblies to be made very rapidly for water circuits in the building trade and for all fluids conveyed in industry at pressures going from a vacuum to 20 bars with high quality plastic material or metal pipes.

Of course the invention is not limitative and a man skilled in the art may make modifications thereto without departing from the scope and spirit of the invention.

I claim:

1. A connection device for joining the open ends of two pipes to permit the transporting of a compressed fluid therethrough, said device comprising:
   (a) a cylindrical housing having opposite open ends capable of receiving the ends of pipes therethrough; said housing having an internal center portion with a tapered inside diameter which is less than the inside diameter of the housing ends; said housing further having a helical ramp disposed on the outer periphery of said housing at each end thereof extending from the ends of the housing, part of the distance toward the center of the housing;
   (b) a pair of tubular engagement elements and a pair of engagement lugs positioned within said housing on either side of and adjacent to said tapered inside diameter portion, each such element being capable of a forcible sealing engagement with one of the ends of a pipe to be connected therewith upon the application of an axial force thereto;
   (c) an annular supporting ring disposed in said housing adjacent to each of said engagement elements at the side thereof furthermost from said tapered inside diameter portion, and being capable of transmitting an axial force to said engagement elements;
   (d) an annular, flexible lip seal member disposed in said housing adjacent to each of said supporting rings at the side thereof furthermost from said tapered inside diameter portion, and being capable of transmitting an axial force to said supporting rings;
   (e) an annular thrust member disposed in and capable of sliding in said housing, positioned adjacent to each of said lip seal members at the side thereof furthermost from said tapered inside diameter portion, and being capable of transmitting an axial force to said lip seal members;
   (f) an annular plug fixed at each end of said housing capable of retaining the thrust member within said housing and allowing the thrust member to slide within the plug; and
   (g) a pair of generally cylindrical assembly/disassembly units, each capable of engaging one of the ends of said housing and a pipe to be joined thereto, said units engaging and applying an axial force on said thrust members.

2. The connection device of claim 1 wherein said assembly/disassembly units, each have a notched opening in a side wall thereof and are capable of partially encircling one of the ends of said housing and a pipe to be joined thereto, said units having outwardly protruding studs capable of sliding within the ramps of said housing and engaging and applying an axial force on said thrust members.

3. The connection device of claim 1, wherein said thrust members further comprises a plurality of recessed rectangular catches disposed circularly at the end thereof which are capable of engaging with said assembly/disassembly units.

4. The connection device of claim 1, wherein the translational movement of the thrust members is transmitted by the rotation of said thrust members coupled to helical cams formed circularly in said plugs and the thrust members.

5. The connection device of claim 1, wherein the assembly/disassembly units are connected to the outer periphery of said housing by means of a cooperating threaded engagement.

6. The connection device of claim 5 wherein the translational movement of the thrust member is transmitted by a rotational force applied to said threaded engagement.

7. The connection device of claim 1 wherein said tubular engagement elements are fixed in said housing by means of an annular retainer.

8. The connection device of claim 1 wherein said annular supporting rings are conical.

9. The connection device of claim 1 wherein said lip seal member has a generally v-shaped cross-section, and which is capable of forming a compressive seal with the inside diameter of said housing and a pipe.

* * * * *